April 23, 1940.                G. H. KRENZER                 2,198,285
                        POTATO AND STONE SEPARATOR
                           Filed Feb. 1, 1939
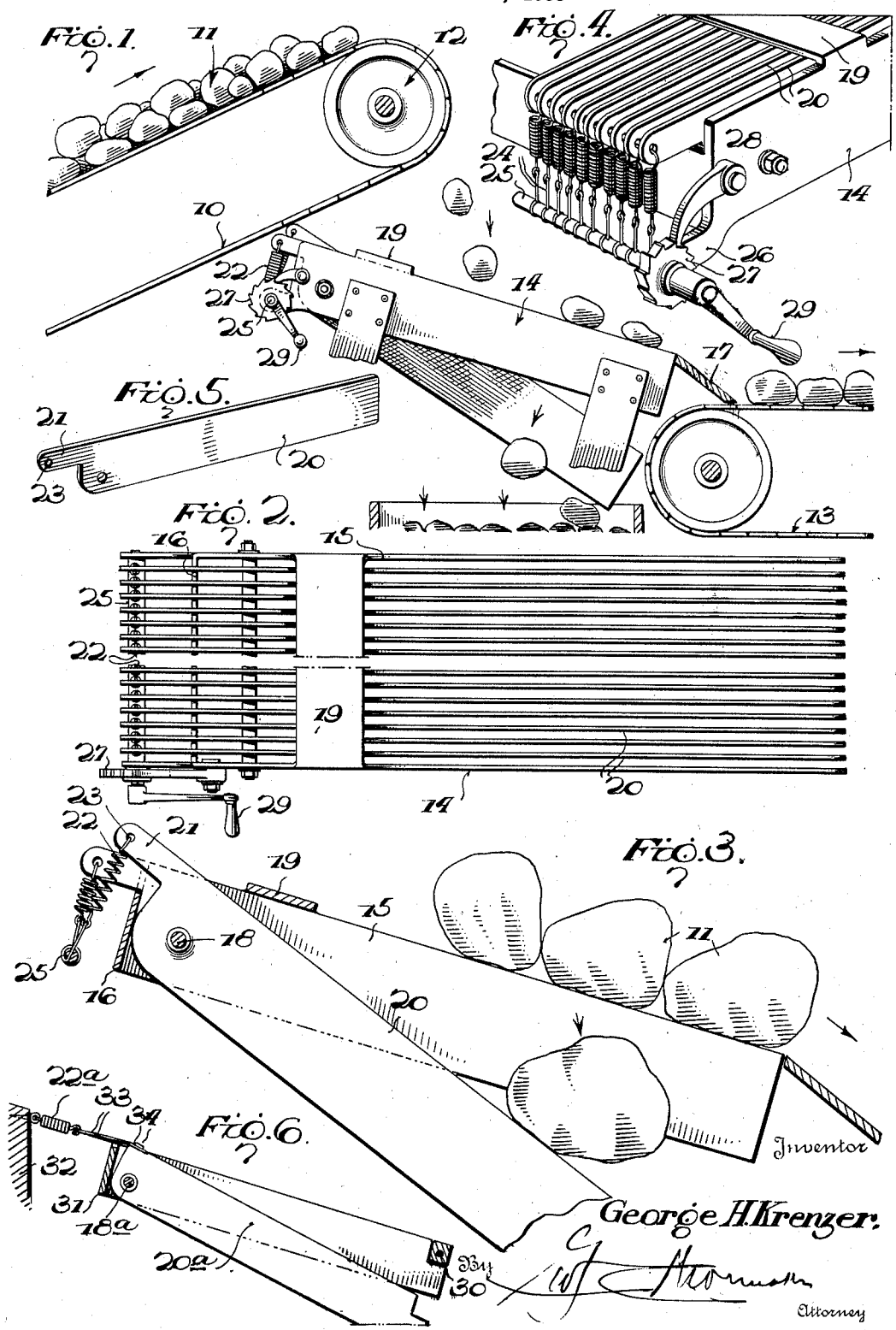
Inventor
George H. Krenzer.
Attorney Patented Apr. 23, 1940

2,198,285

UNITED STATES PATENT OFFICE 2,198,285

POTATO AND STONE SEPARATOR

George H. Krenzer, Rochester, N. Y.

Application February 1, 1939, Serial No. 254,127

2 Claims. (Cl. 209—121)

The present invention relates generally to the harvesting of potatoes considering such harvesting to include not only the digging of the potatoes mechanically but their treatment subsequent to digging in preparing potatoes for shipment to market. The invention relates more particularly to the treatment of potatoes which have been dug mechanically, with the purpose in view of separating out of the dug potatoes, stones and dirt which have been raised therewith from the ground.

It is well known that potatoes grown on any substantial scale are harvested by plowing the same from the ground and that in most instances, the harvesting plow operates in conjunction with an elevator by means of which the freshly dug potatoes are raised from the ground for convenient deposit in sacks and other portable containers. In these containers the potatoes are transferred to stationary apparatus for removing therefrom adhering clods of earth and otherwise conditioning the potatoes as well as culling out the small potatoes and those unfit for market. It frequently occurs that stones are plowed up with the potatoes and in most instances, such stones remain with the potatoes for subsequent removal by hand.

It is the primary object of the present invention to mechanically remove from the potatoes such stones as are dug from the ground with the potatoes and to provide an apparatus for this purpose which may be associated with either the potato harvesting plow or with stationary conditioning apparatus, such as graders, dirt removers, and similar means utilized in the treatment of the potatoes subsequent to their removal from the ground.

It is a further object of the invention to provide a stone remover or separator which will also function as a dirt or clod remover and will continuously and efficiently operate for these dual purposes without the necessity of power in the operation thereof.

Briefly, the invention proposes an arrangement by which the potatoes and stones may be separated by gravity and whereby in so doing, dirt and clods of earth will be released from the potatoes in a manner permitting the invention to be utilized as an attachment to either moving or stationary machines employed in potato harvesting operations.

These objects, as well as the means provided by the invention for accomplishing the same, in carrying the invention into practical effect, may be better understood and more thoroughly appreciated from the following detail description of the invention, and by reference to the accompanying drawing, which forms a part of the specification, and in which Figure 1 is a sectional side view illustrating in a more or less diagrammatic manner the practical application of the invention.

Fig. 2 is a detail top plan view of the separator.

Fig. 3 is a longitudinal sectional view taken therethrough.

Fig. 4 is a fragmentary perspective view showing in detail the tension adjusting means of the separator bars or blades.

Fig. 5 is a detail perspective view of one of the separator bars or blades, and

Fig. 6 is a longitudinal sectional view through a separator constituting a modified form of the invention.

Referring now to these figures, and particularly to Fig. 1, I have shown an inclined conveyor at 10, upwardly along which the potatoes 11 may be carried to the upper discharge end of the conveyor indicated as traveling around a sprocket or pulley 12. Obviously, this conveyor may be the elevating conveyor of a potato digging plow by which the freshly dug potatoes are raised for discharge at present into portable containers, such as bags, boxes and the like. On the other hand, the conveyor 10 may be the feeding conveyor of potato conditioning apparatus such as a grader and cleaner, the conveyor operating in this instance to elevate the potatoes to the grading and cleaning mechanism from a hopper or hoppers disposed at a lower level to provide for conveniently discharging the above mentioned portable containers after the latter have been transported from the digging machine.

In the first of the above instances, the conveyor 10 will, of course, travel with the digging machine, and in the second instance, it will form part of apparatus operating at a stationary point.

In either event, it is proposed with the present invention that the separator thereof shall be mounted beneath the upper discharge end of the conveyor 10 to receive thereon the potatoes, stones and dirt falling from the discharge end of the conveyor, it being the purpose of the separator to receive the falling potatoes in a manner to permit the potatoes to pass therefrom to a discharge conveyor 13 while arresting and removing the stones and dirt.

Thus, the discharge conveyor 13 which it will be noted, is disposed substantially below and at one side of the discharge end of the feeding conveyor 10, may be either inclined or horizontal as desired, and may carry the potatoes to either portable containers with the apparatus as used as an adjunct of the potato digging machine, or on to the grading apparatus where it is used as an attachment in connection with stationary potato conditioning machinery.

The separator as proposed by the present invention, is supported in any suitable manner beneath the discharge end of the receiving conveyor 10 and in a position inclined downwardly away from the same so as to readily discharge the potatoes on to the discharge conveyor 13, and may include a generally rectangular frame of which longitudinal side members 14 and 15 and an upper rear cross bar 16 form parts.

A forwardly and downwardly inclined apron 17 to facilitate discharge of the potatoes on to the discharge conveyor 13 may be connected to the lower forward ends of the side members 14 and 15 of the frame to form a part of the latter. Extending through the side members 14 and 15 at points adjacent to the upper rear cross member 16 and parallel with the latter is a cross shaft 18 and within the frame thus formed, which may also include an upper cross guard rail 19 forwardly of and above the cross shaft 18, are mounted a plurality of separator bars or blades which extend the full length of the frame and are pivoted adjacent to their rear ends upon the cross shaft 18 so that in their normal positions, the upper edges of the several separator bars or blades are in approximately the same plane as the upper edges of the frame side members 14 and 15.

Thus, in their normal positions these several separator bars or blades, which are disposed in the frame in parallel spaced relation, form a downwardly and forwardly inclined potato, stone and dirt receiving surface which it is the purpose of the invention to permit to yield upon the impact of stones and heavier objects in order to allow the same to drop through the separator, while at the same time, to resist yielding upon impact of the lighter potatoes so that the latter may be deflected forwardly and downwardly from the separator and by means of aprons 17 guided to the discharging conveyor 13.

For the above purpose each of the series of separator bars or blades 20 of the series thereof consists of a thin elongated strip of suitable material disposed edgewise in a vertical direction and is adapted to bodily swing for almost its entire length, and all of its effective length between the upper cross guard 19 and the front lower end of the separator by reason of its pivot on the cross shaft 18.

According to one form of the invention, as shown in Figs. 1 to 5, inclusive, the bars or blades 20 are provided at their upper ends with reduced rear extensions 21 overlying the rear cross rail 16 of the frame and serving to receive the upper ends of tension springs 22. Each extension 21 may for this purpose be provided with an opening 23 through which the upper end of its spring 22 may be hooked.

The lower ends of the several springs 22 are provided with connected extensions 24 suitably joined to a tension adjusting shaft 25 and which may be sufficiently flexible to be wrapped more or less around the shaft in order that the tension of the springs 22 may be adjusted and controlled. The shaft 25 may be supported in bearings in connection with the bracket arms 26 projetcing upwardly and rearwardly from the rear ends of the frame side members 14 and 15, as most plainly seen in Fig. 4, and at one or more points the shaft may have a ratchet wheel 27 fixed thereon for engagement by a pawl 28, so that the adjusting shaft whose rotation may be manually effected by an end crank 29, may be held against rotation in one direction in order to lock the same in suitable adjusted position.

Referring again to Fig. 1, it is obvious that since the plurality of separator bars or blades 20 thus form a selectively tensioned though yielding surface for the reception of the potatoes, stones, dirt and the like, falling from the discharge end of the receiving conveyor 10, it is important to support the separator as a whole in its inclined position so that the material discharged from the conveyor 10 will fall on to the separating surface forwardly of the cross guard 19.

It is, of course, important that the vertical swinging movements of the several separator bars or blades be uniformly tensioned so that the latter will not yield or at least not yield perceptibly upon impact of the falling potatoes thereon so that these potatoes will be merely deflected forwardly and downwardly to the discharge conveyor 13 in the manner previously described. The tension of the several springs 22 controlling the separator bars or blades must, however, be such as to permit the latter to readily yield upon impact of stones or heavier objects so that all such will upon the yielding of the bars or blades be permitted to fall through the otherwise open separator to the ground, or to receptacles placed beneath the separator for their reception.

Obviously, the potatoes striking the yielding surface of the separator will receive sufficient impact to dislodge therefrom clinging clods or portions of earth in previous adherence therewith and it is plain that all such dislodged dirt as well as dirt which has been dislodged from the potatoes in the course of their travel upwardly along the reeciving conveyor 10 and is discharged from the latter with the potatoes, may freely fall between the separator bars or blades on to the ground or into receptacles placed to receive the falling stones, it being important that the separator as a whole be positioned and spaced beneath the discharge end of the receiving conveyor 10 so that while the stones pass readily through the yielding surface of the separator the potatoes themselves will not strike the separator bars or blades with sufficient force to bruise the same or otherwise detract from their marketable qualities.

While the form of the invention as thus described in connection with Figs. 1 to 5, inclusive, is highly desirable, in many instances, it is possible to vary the construction to some extent in the manner shown in Fig. 6 in which the separator bars or blades 20$^a$, pivoted adjacent to their rear ends upon a cross shaft 18$^a$ in a separator frame, are notched at their lower forward ends so that instead of being limited in their vertical movement by the cross guard rail 19, as above described, their upward movement may be limited by a cross piece 30 at the upper portion of the lower end of the frame generally indicated at 31. In this form of the invention, moreover, the extensions 21 may be eliminated and the springs 22$^a$, anchored at one end to a suitable support 32 or may be connected to the separator bars or blades 20$^a$ by flexible connections 33 whose ends are anchored in any suitable manner to the upper rear portions of the blades as by means of nails and the like 34.

According to either construction, however, it is obvious the tension of the separator bars or blades may be readily controlled so as to maintain the yielding quality thereof, as above explained, which is necessary for the continued efficiency of the apparatus to relieve the falling stream, including potatoes, stones and dirt, of the stones and dirt.

What is claimed is:

1. A device for separating potatoes from a falling stream of intermingled potatoes, stones and dirt, comprising a series of laterally spaced, thin, flat blades or bars disposed edgewise in vertical relation, with their upper edges normally in horizontal level whereby to cooperate with one another in forming a receiving surface throughout the major portions of the lengths of the bars for receiving the falling potatoes, stones and dirt at various portions of said surface, a frame-like support within a portion of which said bars are pivoted adjacent to one end to swing vertically, and in which the bars are normally maintained in similarly downwardly inclined relation toward their free ends and freely along the receiving surface from the said pivots to their free ends, springs individually connected to the upper pivoted ends of the bars outwardly beyond the frame for controlling vertical swinging movements of the bars, a shaft journalled for rotation outwardly beyond the frame and to which the said springs are connected, a handle for rotating the shaft to adjust the degree of tension of all the springs, and latch means for securing the shaft in rotatably adjusted position.

2. A device for separating potatoes from a falling stream of intermingled potatoes, stones and dirt, comprising a series of laterally spaced, thin, flat blades or bars disposed edgewise in vertical relation with their upper edges normally in horizontal level whereby to cooperate with one another in forming a receiving surface throughout the major portions of the lengths of the bars for receiving falling potatoes, stones and dirt at various portions of said surface, a frame-like support within a portion of which said bars are pivoted adjacent one end to swing vertically and in which the bars are normally maintained in similarly downwardly inclined relation toward their free ends and freely along the receiving surface from the said pivots to their free ends, springs individually connected to the upper pivoted ends of the bars outwardly beyond the frame for controlling vertical swinging movements of the bars, a shaft journaled for rotation outwardly beyond the frame and to which said springs are connected, means for rotating the shaft, and means for securing the shaft in any desired position of angularity.

GEORGE H. KRENZER.